United States Patent [19]

Roberts

[11] 4,062,806

[45] Dec. 13, 1977

[54] CATALYTIC COATING COMPOSITION

[75] Inventor: William Owen Roberts, Wilmington, Del.

[73] Assignee: E. I. Du Pont de Nemours and Company, Wilmington, Del.

[21] Appl. No.: 697,946

[22] Filed: June 21, 1976

[51] Int. Cl.$^2$ .................. B01J 31/02; B01J 21/18; B01J 29/00
[52] U.S. Cl. .................. 252/430; 252/446; 252/454; 126/19 R
[58] Field of Search .................. 252/430, 446, 454; 126/19 R

[56] References Cited

U.S. PATENT DOCUMENTS

| 3,460,523 | 8/1969 | Stiles | 252/454 X |
| 3,658,724 | 4/1972 | Stiles | 252/446 |

*Primary Examiner*—Carl F. Dees

[57] ABSTRACT

A composition for applying an easily removable coating of oxidative catalyst to solid substrates comprising finely divided catalytic oxidation metal solids dispersed in an aqueous solution of alkaline silicate in which is dissolved a vicinal alkane polyol. The composition contains 10–40 pbw alkaline silicate per 100 pbw of catalytic oxidation metal and other water insoluble solids and 40–125 pbw polyol per 100 pbw of alkaline silicate.

12 Claims, No Drawings

CATALYTIC COATING COMPOSITION

BACKGROUND OF THE INVENTION

1. Field of the Invention

The invention relates generally to catalytic coating compositions and to the method by which they can be applied to the surface of solid structures. In particular, the invention is directed to catalytic compositions for use on the walls of cooking devices to effect oxidative decomposition of residues which are deposited thereon during various cooking operations.

2. Prior Art

One of the less pleasant aspects of cooking is the cleaning-up afterward. In particular, the cleaning of household ovens has long been one of the less elegant chores in the kitchen of any household. It is, of course, well-known that the surfaces of ovens and other cooking devices become coated with residue from grease and food particles.

There are three basic approaches to the problem of dirty oven deposits: (1) ignore them; (2) remove them periodically; or (3) prevent them. Though the first of these has frequently been the most prevalent approach, the latter approaches have gained in popularity as they have become less onerous to carry out.

For the last several years, the most prevalent approach to the removal of household oven deposits has been the use of dilute alkali solutions which are sprayed on the surface, allowed to stand for several hours and then removed with a wet sponge. While this method is effective, it is messy, it necessitates the handling of hazardous alkali solutions and is time-consuming. Simultaneously, many oven manufacturers approaches the periodic removal problem by making ovens capable of attaining extremely high temperatures by which the deposits could be removed by burning them off. Though this method is likewise effective, it consumes large amounts of energy and seriously reduces the margin of fire safety in many oven installations.

More recently, domestic appliance manufacturers have approached the problem by applying a coating of catalyst to the interior walls of ovens by which the pyrolytic temperature of oven spatterings is reduced. Thus, deposits on oven walls are removed almost as soon as they are formed at normal cooking temperatures without the use of either extremely high temperatures or alkali solutions.

In this regard, U.S. Pat. No. 3,266,477 to Stiles discloses the use of oxidation catalysts on cooking surfaces to remove food and other cooking residues by catalytic oxidation. Such ovens are disclosed to be self-cleaning at temperatures of 204° to 260° C. In U.S. Pat. No. 3,271,322 to Stiles, there is disclosed a catalytic surface in which catalytic metals are supported on a particulate carrier and the particles anchored to a coating of polytetrafluoroethylene. A further advance in the art was disclosed by Stiles and Yates in U.S. Pat. No. 3,460,523 wherein porous catalytic coatings are provided by the use of catalytic metal oxides bound to the surface with alkali metal silicate binder. In copending U.S. Patent Application Ser. No. 553,425, filed Feb. 26, 1975, (U.S. Pat. No. 3,993,597) Stiles presents a still further advance in the art of catalytic oven coatings with the use of mixtures of the corresponding hydroxides or carbonates with catalytic metal oxides in coating systems using an alkali metal silicate binder. It is also disclosed that, up to a limit of 5.0% by weight, humectant can be used in such coatings to prevent crazing of the surface. Such humectants include glycerin, ethylene glycol, diethylene glycol and the like.

Though self-cleaning ovens using such catalysts are typical of the current production of domestic cooking devices, such convenience has not heretofore been available to owners of the estimated 50 million household ovens in use in the U.S. which were manufactured without catalytic coatings. Thus, there is a real need for catalytic coating compositions which can be applied to existing uncoated ovens by members of the household.

It is, of course, not only desirable that such coatings can be applied at home, but also that they can be removed in the event they are rendered less active by use over a long period of time.

BRIEF DESCRIPTION OF THE INVENTION

The invention is therefore primarily directed to an improved catalytic coating composition which can be easily applied to the surface of household ovens and, likewise, can be easily removed therefrom. In particular, the invention is directed to a composition for applying an oxidation catalyst coating to the surface of a solid substrate comprising (a) finely divided catalytic oxidation metal solids dispersed in (b) an aqueous solution of alkaline silicate in which is dissolved (c) a vicinal alkane polyol, the amount of alkali metal silicate corresponding to 10–40 pbw per 100 pbw of dry water insoluble solids in the composition and the amount of polyol corresponding to 40–125 pbw per 100 pbw alkaline silicate solids in the composition (dry basis).

In a second aspect, the invention is directed to the manner of applying the above-described coating and, in a third aspect, it is directed to a convenient two-package assemblage by which the coating can be prepared and applied without further additions or measurement of the components.

DETAILED DESCRIPTION OF THE INVENTION

The catalytic metal oxides which are suitable for use in the invention are those which are active at temperatures of no higher than about 280°–290° C. Such materials are well known in the prior art relating to oven catalysts and are described in the patents and patent application discussed hereinabove. The catalytic metal oxides preferred for use in the invention are oxides of cobalt, chromium, iron, nickel, manganese, copper, zinc, the rare earths and mixtures thereof.

Oxides of iron, cobalt, nickel and manganese, especially those having the properties described in the above-referred U.S. patent application to Stiles, are particularly preferred. Of these, manganese oxide is particularly advantageous. The expression "manganese oxide" as used herein includes manganese suboxides, $MnO$, $Mn_3O_4$, $Mn_2O_3$, $MnO_2$ and mixtures thereof.

Particularly preferred are those catalytic compositions wherein at least one of the above-referred metals is present in more than one valence state or which is capable of achieving more than one valence state at least transitorily during the course of the oxidative reactions. As will be apparent to those skilled in the art, the oxidation reactions are very complex and may encompass cracking, dehydrogenation, free radical formation and other reactions as well as simple oxidation. Therefore, the expressions "decomposition" and "oxidation" as used herein, are to be understood to include such reactions which occur under oxidative conditions.

In the composition of the invention, the catalytic metal oxide is in the form of particles having a size of less than 35 microns, preferably less than 5 microns and still more preferably less than 2 microns. It is to be understood that the expressions "particles having a size of less than" and "particle size less than" as used herein mean that 100% of the material passes through a screen having openings of the specified dimension or that when the material is viewed under an electron microscope no particles have a dimension greater than the specified value.

From U.S. Pat. No. 3,460,523 it is known that the catalytic activity of surfaces obtained from coating compositions is a function of (1) the surface area of the catalyst, (2) the thickness of the supported porous coating and (3) the concentration of catalyst present in the film. The most preferred compositions are therefore those which maximize these three factors while maintaining good properties in regard to resistance to mechanical abrasion, water resistance, porosity, and mechanical strength.

The catalytic metal oxides used in the invention will generally have surface areas of 5-150 m²/gm. In order to achieve higher levels of activity, it is preferred that the metal oxides have a surface area of at least 10 and especially at least about 15 m²/gm. When manganese oxide is used, the surface area of the catalytic species will usually exceed 50 m²gm.

Crystallite size of the catalytic metal oxides should be 250 Å or less. Furthermore, amorphous manganese dioxide may be used.

The catalyst coating compositions of the invention utilize as binder an alkaline silicate such as an alkali metal silicate selected from the group consisting of lithium, sodium and potassium silicates and their mixtures and the silicates of strong organic bases, such as guanidine, tetramethylammonium hydroxide, tetraethylammonium hydroxide, and their mixtures as taught by U.S. Pat. No. 3,460,523. The silicates of the strong organic bases have a basic dissociation constant in water greater than $1 \times 10^{-3}$. The teachings of U.S. Pat. No. 3,460,523 with respect to the operable alkaline silicates are incorporated herein by reference.

The alkaline silicates are used in the form of their aqueous solutions. Solutions of alkali metal silicates can have a considerable range of mole ratios of silica to metal oxide and are available commercially in a wide range of ratios and concentrations. Usually, the film-forming ability of alkali metal silicates is better at lower mole ratios of silica to alkali metal oxide, whereas water resistance improves with an increase in this ratio.

Useful alkali metal silicates for the purposes of this invention include sodium silicates having a mole ratio of silica to sodium oxide ranging from about 1.5 to 4.5, lithium silicates having a mole ratio of silica to lithium oxide of from about 2 to about 10 or 12 and potassium silicates having a mole ratio of silica to potassium oxide of from about 2 to about 5. Since these silicates are normally available in the form of aqueous solutions having concentrations varying from about 20 to about 40% by weight, this range of concentrations will generally be used for the preparation of the compositions of the invention, solutions having concentrations of at least 30% by weight being preferred. Sodium silicate is the preferred binder for the coating compositions of the invention.

To obtain adequate coating strength, at least about 10 pbw of alkaline silicate (dry basis) must be used for every 100 pbw of catalytic metal oxide and any other water insoluble solids contained in the coating. At least about 20 pbw alkaline silicate is preferred to obtain still better coating strength. However, in order to give the coating adequate porosity, the amount of alkaline silicate should not exceed about 40 pbw. From about 20 to about 30 pbw alkaline silicate are preferred.

As used herein, the term "water insoluble solids" refers to undissolved solid materials which are present in the aqueous coating composition such as catalytic metal oxides, fillers, activated charcoal and the like.

It has been found that the coating composition must contain at least about 40 pbw of a vicinal alkane polyol per 100 pbw of alkaline silicate (dry basis) in order to render the cured coating easily removable. However, the coating should not contain more than about 125 pbw polyol since the physical properties of the coating are adversely affected above that amount. In particular, it becomes extremely difficult to dry the coating after application to a substrate if too much polyol is used and blistering of the coating is likely to occur. Not more than 100 pbw polyol is normally preferred and from about 50 to about 90 pbw appears to be optimum for most surfaces.

Suitable vicinal alkane polyols for use in the invention are those which are substantially water soluble and which correspond to the following structural formula:

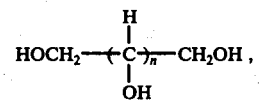

in which $n$ is an integer of from 0 to 4. Because of their superior solubility properties and lower cost, lower molecular weight vicinal alkane polyols, i.e., 1,2-ethanediol (ethylene glycol) and 1,2,3-propanetriol (glycerin) are preferred.

Suitable substrates on which the compositions can be coated include any strong, rigid, heat resistant material such as metals, ceramics, refractory glasses, polycrystalline glaze compositions such as porcelains, "Pyroceram", and the like or a combination of any of these. The practical requirements of a suitable support are that it can be formed into a convenient shape, that it possess appreciable strength and rigidity, and that it have sufficient thermal stability to resist softening, melting and decomposition at temperatures up to about 750° C or somewhat higher.

The most preferred supports are those of structural metals such as steel, aluminum, copper, bronze, and various alloys of these as well as enamel-coated supporting elements of the same metals. A particularly preferred support is a mild steel panel which has been "aluminized", i.e., thinly coated with aluminum or coated with a fused vitreous enamel coating of the type conventionally employed in preparing panels from which the interiors of ovens and similar devices are constructed. The support imparts enhanced rigidity, mechanical strength and shape to coatings or films made from the compositions of the invention.

In coating surfaces of cooking devices with the compositions of the invention the compositions are preferably freshly prepared just prior to coating in the form of a slurry. In some instances, standing for 2-3 hours may be desirable to assure more complete dispersion of the components. This slurry can then be applied in any conventional manner such as by spraying, dipping or brushing onto the surface of the substrate. The coating should, however, be applied no later than about 48 hours after mixing of the catalyst and binder to reduce the likelihood of agglomeration.

It is often advantageous to include in the catalytic coating compositions of the invention 50–200 pbw and preferably 60–100 pbw (basis catalytic metal oxide) of a refractory, substantially water-insoluble filler to improve the toughness of the film and for other purposes. Such material may be selected from the thermally stable, oxygencontaining compounds of lithium sodium, potassium, magnesium, calcium, barium, aluminum, titanium, zinc, boron, phosphorus and silicon, with the proviso that the alkali metal and phosphorus compounds contain at least one other element of the group. Specific examples of suitable fillers include the aluminosilicate clays such as kaolin, magnesium silicates such as talc, chrysotile asbestos and hectorite clay. A preferred filler is ilmenite, $FeTiO_3$. Also suitable as fillers are refractory materials such as titanium dioxide, zirconium oxide and silica in various forms, such as diatomaceous earth, ground amorphous silica glass and silica flour. The most preferred fillers are amorphous silica glass, silica flour, and mixtures of either with 1 to 50% by weight ilmenite.

A particularly preferred class of fillers are those which enhance the water-insolubility of alkali metal silicates by chemical reactions upon drying and firing at low temperatures. Such materials include zinc oxide, magnesium oxide, calcium oxide, as well as many silicates and aluminates of these compounds. Also, some of the thermally stable, water-insoluble alkaline earth phosphates, borates and the like can advantageously be employed in the compositions of the invention to enhance the hardness of films made therefrom and to react partially with the alkali metal silicate bond to enhance water resistance.

Another class of preferred fillers for the catalytic coating compositions of this invention include thermally stable pigments such as carbon black and a variety of ceramic colored oxides. Such pigment materials are well known in the art and can be included in the composition of the invention to enhance the aesthetic appearance of the catalytic coating.

The compositions of the invention may also contain suspending or thixotropic agents to help maintain the particulate catalytic constituents and fillers in suspension prior to the application of the compositions to the surfaces of a cooking device. Suitable suspending agents include polysaccharides such as alginates and sodium carboxymethyl cellulose or inorganic suspending agents such as colloidally dispersed asbestos and colloidally dispersed bentonite clay. Combinations of inorganic and organic suspending agents may be used as well.

For purposes of simplicity and reliability in preparing the coating for application, it is preferred to formulate the components of the catalyst coating into two parts: (1) a mixture of the water insoluble solid components of the coating, i.e., the catalyst, filler and pigment; and (2) an aqueous solution of the soluble components, i.e., the alkali metal silicate, the vicinal alkane polyol and any thickeners, suspending agent or other soluble additive. By packaging these two formulations in appropriately sized proportions, the catalyst coating composition can be prepared quite simply by adding the contents of one package to the contents of the other. Thus, a still further aspect of the invention is an assemblage for the preparation of oxidation catalyst coating compositions comprising (a) a first container of finely divided catalytic oxidation metal solids and (b) a second container of an aqueous solution of alkaline silicate in which is dissolved the polyol, the amount of alkaline silicate corresponding to 10–40 pbw per 100 pbw of dry water insoluble solids in the first container and the amount of polyol corresponding to 40–125 pbw per 100 pbw of alkaline metal solids in the second container, dry basis.

The coating composition, the essential proportions of which have been discussed above, must be formulated in a manner consistent with both the manner of application and the adhesive characteristics of the wet coating to the substrate being treated. Thus, thermally degradable thickeners or thixotropic agents may be added to the basic ingredients to thicken or thin out the coating composition for brushing, dipping or spraying, as the case may be.

Even though the coating composition with adhere quite well to most clean support surfaces of the type discussed above, it will be preferred in many instances to apply to the surface to be treated an undercoat of aqueous alkali metal silicate solution before applying the catalyst coating. A particularly desirable undercoat having outstanding strength and hardness is one consisting of alkali metal silicate solution and from 50 to 150 pbw silica flour per 100 pbw of dry alkali metal silicate solids. A particularly useful undercoat consists of 40% wt sodium silicate solution ($SiO_2/Na_2O$ = 2.87, 43.1% solids), 40% wt silica flour ($SiO_2$) and 20% wt additional water. The undercoat acts as a primer for the catalytic coating and greatly increases the adhesion of the catalytic coating, especially to porcelain enamel substrates.

The layer of undercoat can be applied by the usual methods such as brushing or spraying, but a most convenient way is to wipe it on with a clean damp sponge and to lay on a thin film of the undercoat which can be allowed to dry at room temperature without heating. The catalytic coating is then applied on top of the undercoat.

It will be apparent that the catalytic coating should be applied as uniformly as possible. In most households this can be most readily done by painting it on with a brush.

To avoid both blistering and surface skinning, it is preferred first to dry the applied coating at a slow-to-moderate rate until its water content is below about 10% wt, preferably about 5% wt. The easiest and often preferred method for doing this is to let the coating stand under room conditions of temperature and humidity for a period of about 4 hours. It is also possible to allow the coating to dry for longer periods of time, such as overnight, when such longer times are more convenient. On the other hand, the drying time can be considerably shortened by heating the coating. For example, the time necessary to dry the coating at 66° C is only about 30 minutes. The drying temperature should not, however, exceed 100° C, the boiling point of water. Within the above-described limits of drying temperature, a small amount of water, estimated to be about 2.5%, remains in the coating and is therefore present at the beginning of the curing step which follows.

Curing of the dried coating is carried out by heating it to a temperature of at least about 100° C but no more than about 290° C, and preferably no more than about 200° C, for a time sufficient for the coating to reach an equilibrium composition. The length of time it takes to achieve adequate curing of the dried coating is, of course, related inversely to the temperature. Thus, at about 200° C, curing is completed in about 1 hour; whereas, at 260° C, curing is completed in as little as 30 minutes. As curing temperatures approach 290° C, the curing time may be reduced to as low as 3 minutes, but preferably is at least about 10 minutes. A curing temperature of 200°–280° C is preferred. A preferred procedure for curing the coating is to heat the coating for 10 minutes at 120° C and then raise the coating temperature to 200° for 1 hour. The criterion for minimum time in the curing step is believed to be a function of both physical elimination of the remaining water and chemical modifications of the vicinal alkane polyol. The fully cured coating contains practically no water except that which is adsorbed by the porous coating as a consequence of reaching equilibrium with atmospheric moisture.

The invention is illustrated by the following Examples:

EXAMPLE I

A binder composition and a water-insoluble solids composition were prepared having the following compositions: Binder: 65% wt Sodium silicate solution, 43.1% wt solids

| Solids: | ($SiO_2/Na_2O$ = 2.87) 15% wt. $H_2O$ 20% wt Glycerine[3] 60% wt Manganese Oxide powder[1] 37% wt Silica flour[2] 3% wt Carbon black[4] |
|---|---|

[1]90% $MnO_2$, Type SM, trade name of Chemetals Division, Diamond Shamrock Corp., Baltimore, MD
[2]325 Mesh Silica flour ex Unisil Corp., New York, NY
[3]USP, 99.5% wt minimum ex FMC Corp., Chicago, IL
[4]Aqua Nuchar Grade (granular) ex Westvaco Corp., Covington, VA These two compositions were then blended in a volumetric ratio of 7 parts of binder to 8 parts of water-insoluble solids and applied by painting onto a 10.2 × 10.2 cm porcelainenamelled steel panel. The applied coating was allowed to dry overnight at room temperature (about 20° C) and was then cured by heating at 204° C for 60 minutes. The resultant cured catalytic coating had the following approximate composition:

| Manganese Oxide | 45% wt |
|---|---|
| Silica Flour | 27.5 |
| Sodium Silicate Solids | 17.5 |
| Glycerine | 7.5 |
| Activated Carbon | 2.5 |
| | 100.0 |

By comparison of the weight ratio of glycerine to any of the other components, it will be noted that about 40% of the glycerine was lost during the one hour curing step. Moreover, it has been found that even more prolonged heating at this temperature does not result in total loss of the glycerine. Therefore, it is believed that the glycerine undergoes some thermal degradation which results in the formation of a less volatile polymeric species.

The above-described coating was found to have excellent physical strength. Yet, it was surprisingly easy to remove from the panel by conventional oven cleaning methods. More particularly, the panel was sprayed with a coating of dilute (3%) aqueous sodium hydroxide[1]. After standing for two hours, more than 90% of the coating was removed by wiping with a wet sponge. The remaining portion of the catalytic coating was easily removed with a household abrasive pad.

[1]"Easy Off", trade name of Boyle-Midway Div. of American Home Products Corp.

EXAMPLE II

Using the procedure of Example I, a catalytic coating was prepared in which 1,2-ethanediol (ethylene glycol) was substituted for the glycerine. The coating prepared with 1,2-ethanediol had substantially the same properties as the coating of Example I.

EXAMPLE III

A further series of tests was conducted which shows the quite important function of the polyol in making the coating readily removable. In this series, a quantity of catalytic coating made in the same manner and having the same composition as in Example I, was divided into four parts. One portion was left as is and contained 50 pbw glycerine per 100 pbw sodium silicate solids. By adding successively greater amounts of glycerine to the other three portions, they contained respectively 68, 86 and 104 pbw glycerine per 100 pbw sodium silicate. Each of the coatings was applied and cured in the same manner as Example I.

At 50 pbw glycerine, the cured coating was about 90% removable by a wet sponge and was of a uniform gray-black color. However, at higher levels of glycerine, the coating became increasingly soft and discolored by mottled brown areas. At 104 pbw glycerine the coating was quite operable, but showed signs of being insufficiently hard to stand up to normal household wear and tear. Thus, a maximum of about 120 pbw polyol per 100 pbw alkaline silicate should be used. On the other hand, it was evident that below about 40 pbw polyol, the cured catalytic coating would be difficult to remove.

EXAMPLE IV

A series of tests was then run to determine whether other than vicinal polyols might be suitable. It was interesting to note that when non-vicinal diols were substituted (1,3-butanediol, 1,4-butanediol and 1,3-propanediol) in place of the glycerine, formulated and tested in the same manner as Example I, the resultant liquid formulation tended to be unstable and incurred gelling. The gelled coatings could not be satisfactorily painted on a substrate. Furthermore, when the coatings were formulated with sufficiently low concentrations of diol to avoid gelation, the cured coatings after treatment with oven cleaner were not removable by scrubbing with a sponge. Thus, the vicinal polyols appear to be unique in their capability of being formulated into stable coatings and in rendering the cured coating removable by scrubbing.

The catalytic coating of the invention is a hard, porous, inorganic coating which provides a "continuous clean" surface which rids itself of soil at normal cooking temperatures and, given proper care, will maintain a presentably clean appearance throughout the life of the oven.

Spattered soil droplets which strike the coating are absorbed into its porous interior and are caused to spread out over a large surface area. This increases the natural tendency of some of the soil to evaporate. In addition, the many active catalyst sites in the coating cause the spatter to be slowly oxidized away converting it into water and carbon dioxide. The oxidation takes place slowly enough so that the soil spattered onto the oven wall during a cooking cycle is not all oxidized away during that particular cooking cycle. The soil remaining is oxidized away during subsequent cooking cycles. Generally the hotter the oven, the faster the soil is oxidized.

It is necessary for the oxidation to take place to have oxygen from the air available in the pores of the coating. A heavy spill will block access of the air to the catalytic coating and its effectiveness will be seriously curtailed. For this reason large spills should be wiped up as soon as possible. While the catalyst coating will eventually clear itself, it may take a long time and some permanent staining could result.

The small particulate matter often found in meat spatters will not penetrate into the pores of the coating, and from time to time it may be found desirable to wipe these deposits away from the surface of the catalytic coating. This can be done easily with a damp sponge.

The continuous cleaning catalytic coating has no effect on the taste or texture of the meat cooked in an oven coated with it.

EXAMPLE V

The following example illustrates the functioning of the catalytic coating compared with uncoated oven walls. This experiment was done with a specially constructed oven which allowed the small amount of residue deposited on a section of the oven wall during actual cooking to be determined by weighing. After each 16 meals the oven wall were weighed and the weight increase due to the deposition of unremoved fats and varnished deposits was observed and recorded. After 64 meals the uncoated panels were extremely dirty and the tests were discontinued on the uncoated oven wall. An additional 48 meals were prepared against a catalytically coated oven lining like the one in Example I. As can be seen from the data in Table I below, the small weight gain observed early in the cooking remains approximately constant as the amount of soil deposited becomes roughly equal to the amount of soil cleaned away during the cooking operation. At the end of the test, there were small amounts of particulate matter deposited on the surface of the catalytic coating. However, when wiped gently with a damp sponge, these particles came off easily and the coated oven wall appeared almost as if it were unused. The uncoated panel, on the other hand, could not be wiped clean with a damp sponge and required extensive cleaning with caustic oven cleaners in order to be returned to a presentably clean appearance.

TABLE I

COMPARISON OF CATALYTIC AND NON-COATED OVEN WALL RESIDUES

| Number of Meals Prepared | Weight of Residue on Walls (grams) | |
|---|---|---|
| | Uncoated Walls | Catalytic Walls |
| 0 | 0 | 0 |
| 16 | 0.1 | 0 |
| 32 | 0.2 | 0.01 |
| 48 | 0.3 | 0.04 |
| 64 | 0.4 | 0.03 |
| 80 | — | 0.03 |
| 96 | — | 0.02 |
| 112 | — | 0.02 |

I claim:

1. A composition for applying an oxidation catalyst coating to the surface of a solid substrate comprising (a) finely divided catalytic metal oxides dispersed in (b) an aqueous solution of alkaline silicate in which is dissolved (c) a vicinal alkane polyol, the amount of alkaline silicate corresponding to 10-40 pbw per 100 of any water-insoluble solids in the composition and the amount of polyol corresponding to 40-125 pbw per 100 pbw alkaline silicate, dry basis, in the composition.

2. The composition of claim 1 in which the vicinal alkane polyol corresponds to the structural formula

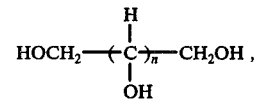

in which $n$ is an integer of from 0 to 4.

3. The composition of claim 2 in which the vicinal alkane polyol is 1,2-ethanediol.

4. The composition of claim 2 in which the vicinal alkane polyol is 1,2,3-propanetriol.

5. The composition of claim 1 in which the alkaline silicate corresponds to 20-30 pbw per 100 pbw of dry water-insoluble solids.

6. The composition of claim 1 in which the vicinal alkane polyol corresponds to 50-85 pbw per 100 pbw of dry alkaline silicate solids.

7. The composition of claim 1 in which the water-insoluble solids are comprised on an admixture of 50-200 pbw finely divided inert filler per 100 pbw of catalytic metal oxides.

8. The composition of claim 1 in which the waterinsoluble solids are comprised of an admixture of 1-10 pbw of finely divided activated carbon per 100 pbw of catalytic metal oxides.

9. The composition of claim 1 in which the alkaline silicate is an alkali metal silicate.

10. The composition of claim 9 in which the alkali metal silicate is sodium silicate.

11. The method of preparing a catalytic oxidation surface comprising
   1. applying to the surface of a solid substrate a coating comprising (a) finely divided catalytic metal oxides dispersed in (b) an aqueous solution of alkaline silicate in which is dissolved (c) a vicinal alkane polyol, the amount of alkaline silicate corresponding to 10-40 pbw per 100 pbw of dry water-insoluble solids in the composition and the amount of polyol corresponding to 40-125 pbw per 100 pbw dry alkaline silicate, dry basis, in the composition;
   2. drying the applied coating; and
   3. curing the dried coating for a period of at least about 30 minutes at a temperature of 150°-280° C.

12. An assemblage for the preparation of oxidation catalyst coating compositions comprising (a) a first container of finely divided catalytic metal oxides and (b) a second container of an aqueous solution of alkaline silicate in which is dissolved vicinal alkane polyol, the amount of alkaline silicate corresponding to 10-40 pbw per 100 pbw of dry water-insoluble solids in the first container and the amount of polyol corresponding to 40-125 pbw per 100 pbw of dry alkaline silicate, dry basis, in the second container.

* * * * *